(12) United States Patent
Arneau et al.

(10) Patent No.: US 7,554,552 B2
(45) Date of Patent: Jun. 30, 2009

(54) METHOD OF GRAPHICAL GENERATION OF VECTORS WITH DARK CONTOURS

(75) Inventors: David Arneau, Pessac (FR); Eric Filliatre, Merignac (FR)

(73) Assignee: Thales (FR)

( * ) Notice: Subject to any disclaimer, the term of this patent is extended or adjusted under 35 U.S.C. 154(b) by 382 days.

(21) Appl. No.: 11/587,054

(22) PCT Filed: Apr. 20, 2005

(86) PCT No.: PCT/EP2005/051736
§ 371 (c)(1),
(2), (4) Date: Oct. 20, 2006

(87) PCT Pub. No.: WO2005/114581

PCT Pub. Date: Dec. 1, 2005

(65) Prior Publication Data

US 2007/0177795 A1     Aug. 2, 2007

(30) Foreign Application Priority Data

Apr. 20, 2004   (FR) .................................. 04 04144

(51) Int. Cl.
*G09G 5/00* (2006.01)
*G09G 5/02* (2006.01)
*G06T 5/22* (2006.01)
*G06K 9/48* (2006.01)
*G06K 9/00* (2006.01)
*G06K 9/40* (2006.01)
*G03F 3/08* (2006.01)

(52) U.S. Cl. .................. 345/589; 345/428; 345/581; 345/586; 345/611; 382/162; 382/199; 382/266; 382/300; 358/518

(58) Field of Classification Search ................ 345/428, 345/581, 586, 589, 592–594, 600, 606, 611, 345/643, 441, 467; 382/162–167, 199–200, 382/269, 274, 266, 197, 300; 358/518–522, 358/525, 470

See application file for complete search history.

(56) References Cited

U.S. PATENT DOCUMENTS 5,243,695 A    9/1993   Russell et al.

(Continued)

FOREIGN PATENT DOCUMENTS

EP    1074938    2/2001

OTHER PUBLICATIONS

Gupta S et al, "Filtering edges for gray-scale displays", Computer Graphics USA, vol. 15 No. 3, Aug. 1981, pp. 1-5, XP002305181.

*Primary Examiner*—Wesner Sajous
(74) *Attorney, Agent, or Firm*—Lowe Hauptman Ham & Berner, LLP (57) ABSTRACT

The field of the invention is that of graphical libraries providing graphical functions used for the drawing of symbologic images. One of the fields of favored application is the generation of symbologic images for the piloting of aircraft. The object of the invention is to propose a method of graphical generation of a colored vector surrounded by a dark contour (H) on a background likewise colored as a single drawing, making it possible to preserve the function of antialiasing. The method uses two different mixing laws dependent on the position of the pixel of the vector with respect to the central axis of the vector. This method presents the following advantages:

- The calculations are optimized and successive writes to the buffer-memory are avoided;
- The dark contour is drawn at the same time as the vector of which it forms an integral part and thus becomes a functional state of the vector;
- The method takes into account the relative priority of the vectors with a single ordering logic.

10 Claims, 6 Drawing Sheets

U.S. PATENT DOCUMENTS

| | | |
|---|---|---|
| 5,790,128 A | 8/1998 | Filliatre et al. |
| 6,133,901 A | 10/2000 | Law |
| 6,329,977 B1 | 12/2001 | McNamara et al. |
| 2002/0141003 A1* | 10/2002 | Chang et al. ................ 358/518 |
| 2002/0158979 A1 | 10/2002 | Jaspers |
| 2005/0063596 A1* | 3/2005 | Yomdin et al. .............. 382/232 |
| 2005/0180659 A1* | 8/2005 | Zaklika et al. .............. 382/309 |
| 2006/0257048 A1* | 11/2006 | Lin et al. .................... 382/276 |

* cited by examiner

METHOD OF GRAPHICAL GENERATION OF VECTORS WITH DARK CONTOURS

CROSS-REFERENCE TO RELATED APPLICATIONS

The present Application is based on International Application No. PCT/EP2005/051736, filed on Apr. 20, 2005, which in turn corresponds to France Application No. 04/04144 filed on Apr. 20, 2004, and priority is hereby claimed under 35 USC §119 based on these applications. Each of these applications are hereby incorporated by reference in their entirety into the present application.

BACKGROUND OF THE INVENTION

1. Field of the Invention

The field of the invention is that of graphical libraries providing graphical functions used for the drawing of symbologic images. One of the fields of favored application is the generation of symbologic images for the piloting of aircraft. These images are in particular used for navigation, piloting and management of critical systems, such as engine checks.

2. Description of the Prior Art

Graphical images are generated on matrix screens, such as, for example, liquid crystal displays. The generation of the graphical image is done in the following manner: a buffer-memory called a "frame-buffer" is filled with the various symbologies necessary for the image, these symbologies being assigned an order of priority; when all the symbologies have been created in the buffer-memory, its content is then dispatched to the display. These graphical images are generated in real time.

Figure 1:
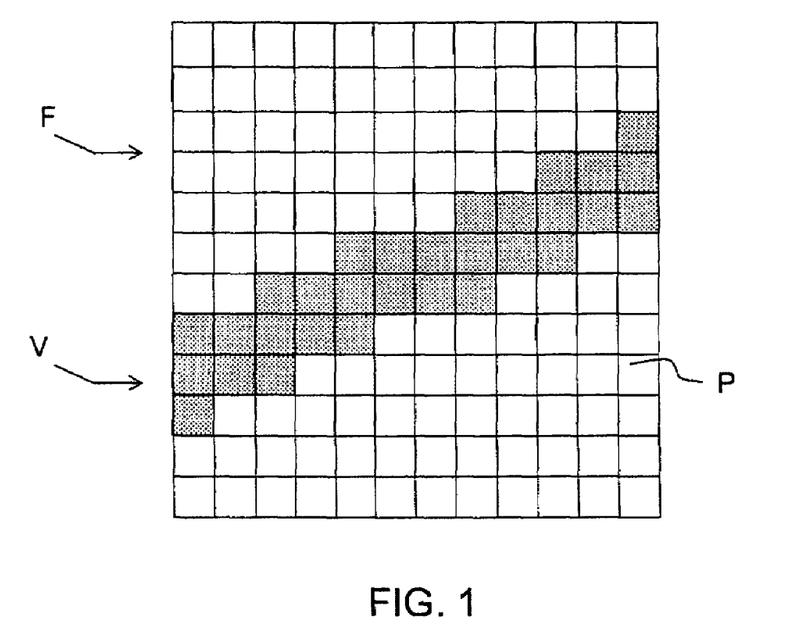
FIG. 1 represents the phenomenon of staircasing due to pixellation on a vector part.

Any linear graphical symbol can be decomposed into oriented elementary segments also called vectors. When generating a vector V of a certain thickness of a first initial color on a background of a second initial color, if the color of the pixels P is either the color of the vector V or the color of the background F, one obtains, as indicated in FIG. 1 which represents a part of the display, staircasing due to pixellation. The pixels of the vector V are represented in gray in this figure. Even if the resolution of the screen is significant, this staircasing is seen by the user and constitutes a visual hindrance.

To attenuate this visual effect, a procedure known as "antialiasing" is used. One also speaks of "antialiased" vectors to designate vectors having undergone "antialiasing". It consists in mixing for the pixels situated at the boundaries of the vector the color of the vector with the color of the background by applying a mixing law, function of a transparency law dependent on a transparency coefficient A and initial colors of the vector and of the background.

Figure 2:
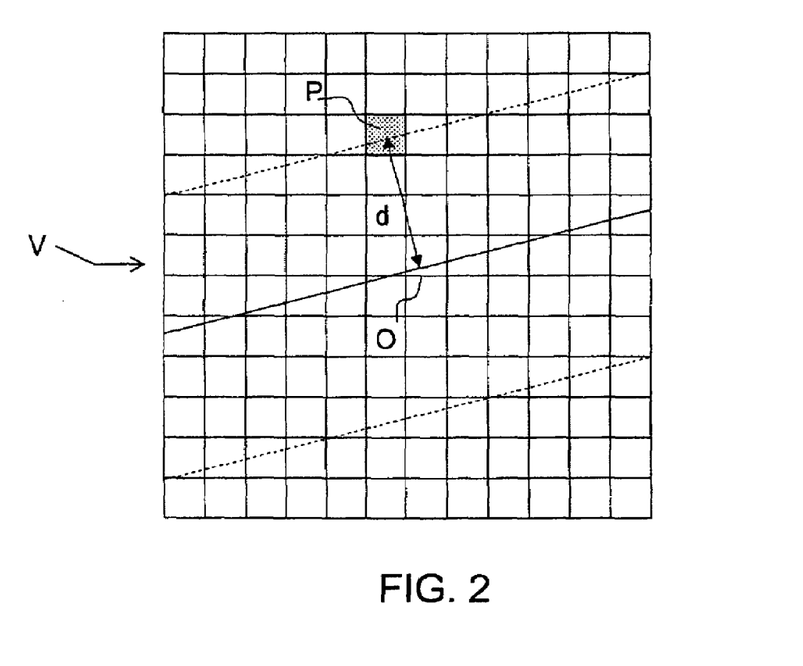
FIG. 2 represents the distance from a pixel to the central axis of the vector.
Figure 3:
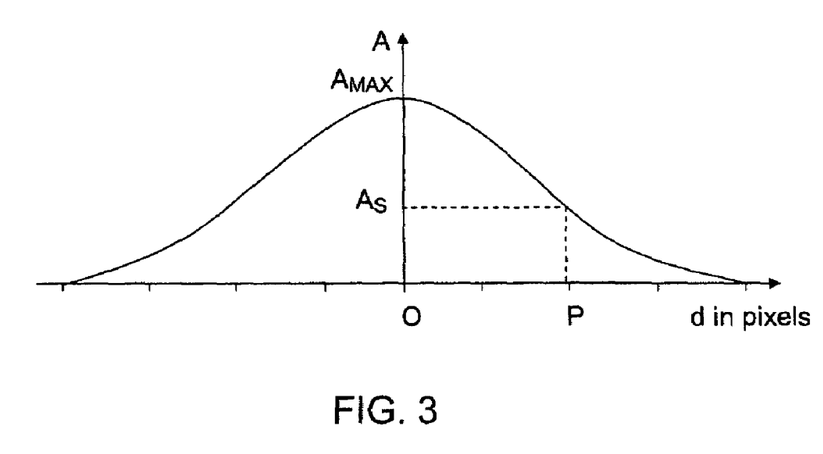
FIG. 3 represents the transparency coefficient as a function of the distance from the central axis of the vector.

The value of the coefficient A depends on the distance d of the pixel P with respect to the central axis O of the vector as indicated in FIG. 2 where the theoretical limits of the vector are depicted dashed. This coefficient is maximal at the center and equals $A_{MAX}$ and decreases progressively and symmetrically towards zero on moving away from the central axis of said vector. By way of example, FIG. 3 represents the variations of the coefficient A as a function of the distance d from the central axis of the vector. Generally, the mathematical function representing A is a Gaussian. The transparency coefficient of a given pixel P is denoted $A_S$.

The color of a pixel is conventionally represented by a triple of calorimetric components. Typically, this triple comprises a red component $R_D$, a green component $G_D$ and a blue component $B_D$. In this case $R_F$, $G_F$ and $B_F$ denote the calorimetric components of the initial color of the background and $R_S$, $G_S$ and $B_S$ the colorimetric components of the initial color of the vector.

A possible mixing law making it possible to determine the colorimetric components $R_D$, $G_D$ and $B_D$ of the pixel is then:

$$R_D = \left(\frac{A_S}{A_{MAX}} \cdot R_S\right) + \left(\frac{A_{MAX} - A_S}{A_{MAX}} \cdot R_F\right)$$

$$G_D = \left(\frac{A_S}{A_{MAX}} \cdot G_S\right) + \left(\frac{A_{MAX} - A_S}{A_{MAX}} \cdot G_F\right)$$

$$B_D = \left(\frac{A_S}{A_{MAX}} \cdot B_S\right) + \left(\frac{A_{MAX} - A_S}{A_{MAX}} \cdot B_F\right)$$

Figure 4:
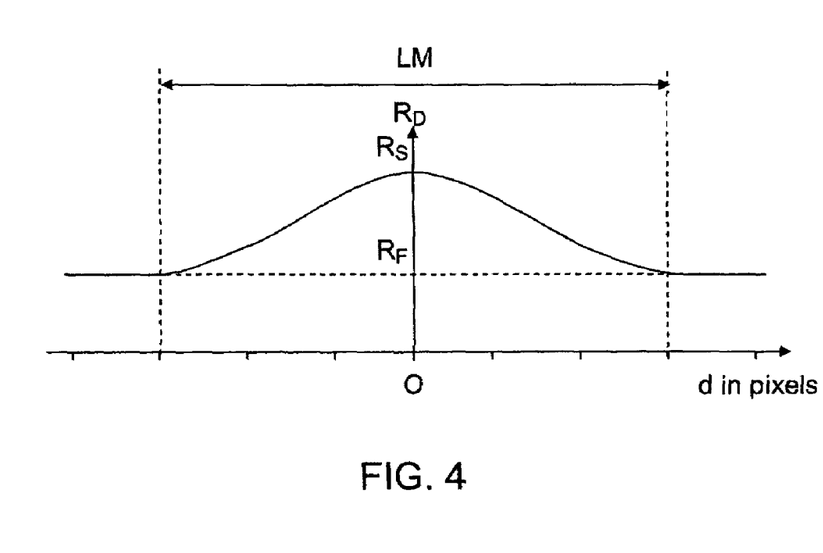
FIG. 4 represents the variation of a colorimetric component as a function of a mixing law.
Figure 5:
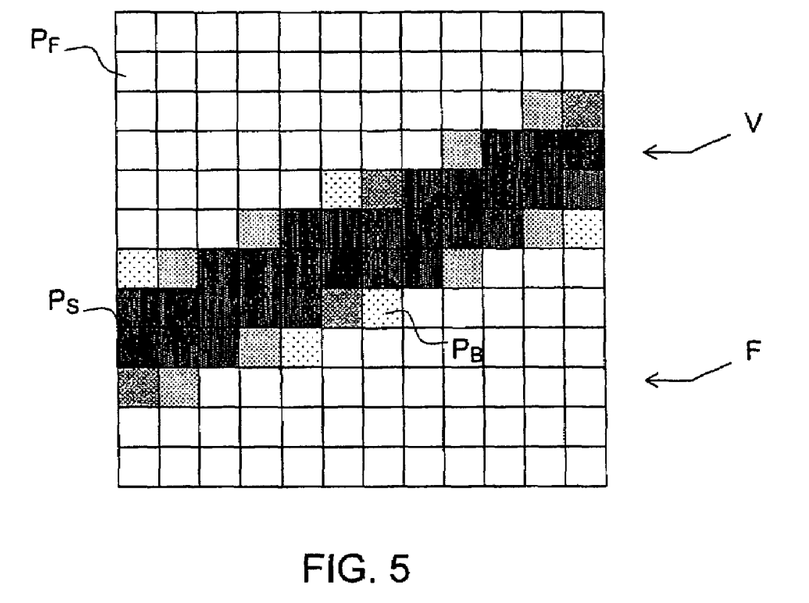
FIG. 5 represents the effect of the antialiasing on a vector part.

By way of example, FIG. 4 shows the variation of the component $R_D$ as a function of the distance d from the central axis of the vector. The dashed vertical limits correspond to the limits of application of the mixing law LM. The calorimetric components $G_D$ and $B_D$ have much the same shape. After application of the mixing law to the pixels, a depiction of the type of that of FIG. 5 is obtained, which represents a vector part V "antialiased" on a background F. The pixels $P_S$ belonging to the core of the vector have the initial color of the vector, black in FIG. 5, the pixels $P_F$ situated far away from the vector have the color of the background, white in FIG. 5, the pixels $P_B$ situated at the boundary of the vector and of the background have intermediate colors between that of the vector and that of the background, represented by gray hues in FIG. 5.

Figure 6:
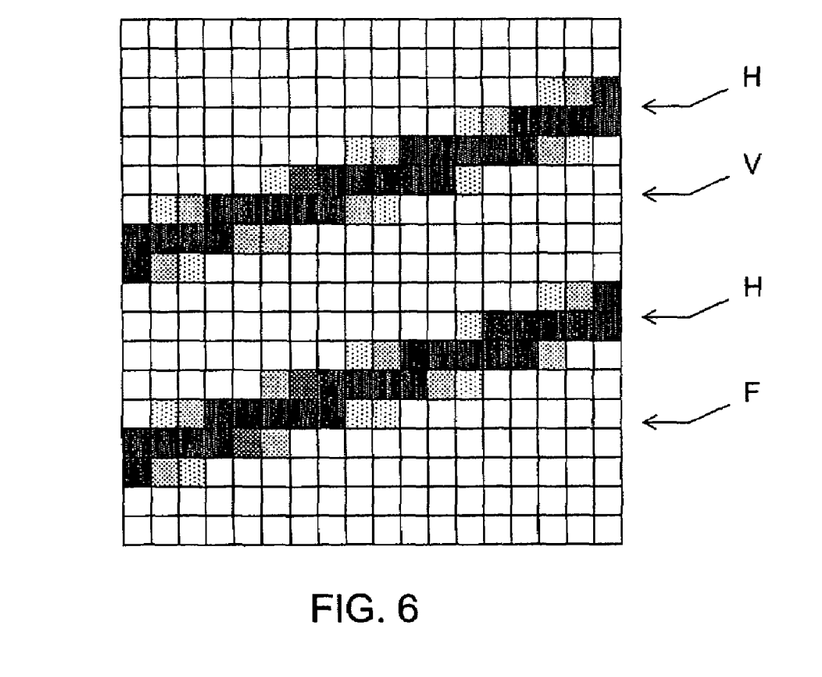
FIG. 6 represents the combined effect of haloing and of antialiasing on a vector part.

The "antialiasing" makes it possible to attenuate the defects related to pixellation. However, when the vector and the background have very much the same or identical colors, the vector disappears on the background through lack of contrast. For certain applications, the colors are normalized and it is consequently impossible to change the color of the vector to regain the contrast. In this case, the solution implemented consists in surrounding the vector with a dark contour so as to depict the vector on the background whatever their respective colors. This technique is called "haloing". FIG. 6 illustrates this principle where a part of the vector having undergone the "haloing" is represented. A vector V of identical color to the background is surrounded by a dark contour also called a halo H. The vector appears on the background F by virtue of this halo. To generate this contour, the principle generally applied consists in drawing a first "antialiased" vector of black color then a second likewise "antialiased" of the desired color, of lower thickness, of identical length and identical orientation to the first, the colors of the pixels of the second vector replacing in the buffer-memory the black color of the pixels of the first vector. Thus, ultimately, one obtains the second vector surrounded by a dark contour due to the first thicker black vector.

This method of graphical generation of a colored vector surrounded by a dark contour has several drawbacks detailed below:

the color of the pixels of the core of the vector is modified twice in the buffer-memory, a first time to generate the black vector and a second time to generate the vector of the desired color. But, the symbologies are generated in real time usually with complex graphics. It is therefore important to limit for each pixel, the unnecessary changes of color in the buffer-memory, which are expensive in terms of calculation and addressing time;

functionally, it is necessary to generate two different vectors with different drawing parameters while preserving the same graphical coordinates;

graphically, when two lines with halo cross, it is necessary to impose a logic of ordering of the drawings, differing according to the visual effect desired. If one of the two vectors is required to pass above the other, it is necessary firstly to draw the black part of the vector underneath, then the colored part of the same vector, then the black part of the vector on top, then the colored part of the vector on top. If, conversely, the two vectors are required to merge, it is necessary to draw the black part of the first vector, the black part of the second vector, the colored part of the first vector and finally, the colored part of the second vector.

SUMMARY OF THE INVENTION

So, the object of the invention is to propose a method of graphical generation of a colored vector surrounded by a dark contour on a background likewise colored as a single drawing and making it possible to preserve the function of antialiasing. This method presents the following advantages:

- the calculations are optimized and the unnecessary successive p writes to the buffer-memory are avoided;
- the dark contour is drawn at the same time as the vector of which it forms an integral part and thus becomes a functional state of the vector;
- the method takes into account the relative priority of the vectors with a single ordering logic. If two vectors have the same priority, the black halo goes right around the two vectors. If the first vector has priority, then the black halo of this vector crosses the second vector, the black halo of the second vector disappearing in the intersection zone.

More precisely, the invention is aimed at a method of graphical generation, on a matrix screen composed of pixels, of a colored vector surrounded by a dark contour on a likewise colored background, the color of the pixels being defined by three calorimetric components, characterized in that each calorimetric component of each pixel of the vector is proportional:

- when the distance from the center of the pixel to the center of the vector is less than a distance representative of the thickness of the vector, to a first mixing law depending on the one hand on a calorimetric component representative of the color of the vector and on the other hand a first transparency law dependent on said distance from the center of the pixel to the center of the vector;
- when the distance from the center of the pixel to the center of the vector is greater than a distance representative of the thickness of the vector, to a second mixing law, sum:
  - of the first mixing law;
  - of an additional function depending on the one hand on the colorimetric component representative of the color of the background and on the other hand a second transparency law dependent on said distance from the center of the pixel to the center of the vector.

Advantageously, the first transparency law is maximal when the distance from the center of the pixel to the center of the vector is zero and decreases as a function of said distance, the second transparency law is minimal when the distance from the center of the pixel to the center of the vector corresponds to the distance representative of the thickness of the vector and increases as a function of said distance up to a finite limit.

Advantageously, the first mixing law is the product of one of the calorimetric components representative of the color of the vector, multiplied by the first transparency law dependent on the distance from the center of the pixel to the center of the vector, the additional function is the product of one of the calorimetric components of the background, multiplied by the second transparency law dependent on the distance from the center of the pixel to the center of the vector.

Advantageously, the first and the second transparency law depend on a transparency coefficient A whose variations obey one and the same law of variation.

Advantageously, an order of priority of drawing is associated with each vector, when two vectors of different priority have a common intersection, in the intersection zone, the colorimetric components of the pixels are those of the pixels of the vector having the highest priority.

When two vectors of identical priority have a common intersection, the second vector being drawn after the first vector, in the intersection zone, the calorimetric components of the pixels of the second vector are determined in the following manner, the pixels of the first vector being regarded for the application of the mixing laws as a colored background:

- If the distance from the center of the pixel to the center of the second vector is less than a distance representative of the thickness of the second vector and if the distance from the center of the pixel to the center of the first vector is less than a distance representative of the thickness of the first vector, the calorimetric components of the pixel are proportional to a mixing law of second mixing law type;
- If the distance from the center of the pixel to the center of the second vector is greater than a distance representative of the thickness of the second vector and if the distance from the center of the pixel to the center of the first vector is greater than a distance representative of the thickness of the first vector, the colorimetric components of the pixel are proportional to a mixing law of second mixing law type;
- If the distance from the center of the pixel to the center of the second vector is less than a distance representative of the thickness of the second vector and if the distance from the center of the pixel to the center of the first vector is greater than a distance representative of the thickness of the first vector, the calorimetric components of the pixel are proportional to a mixing law of first mixing law type;
- If the distance from the center of the pixel to the center of the second vector is greater than a distance representative of the thickness of the second vector and if the distance from the center of the pixel to the center of the first vector is less than a distance representative of the thickness of the first vector, the calorimetric components of the pixel are not modified and remain that of the pixel of the first vector.

BRIEF DESCRIPTION OF THE DRAWINGS

The invention will be better understood and other advantages will appear on reading the nonlimiting description which follows and by virtue of the appended figures among which.

DETAILED DESCRIPTION OF THE DRAWINGS

Figure 7:
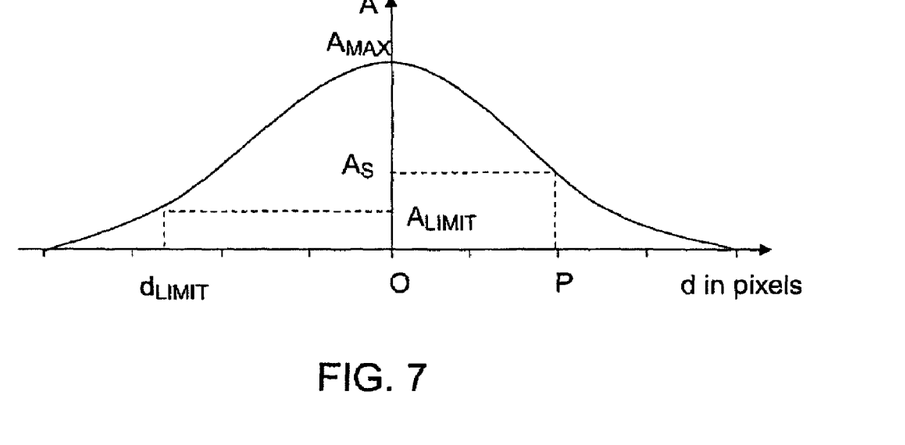
FIG. 7 represents the transparency coefficient as a function of the distance from the central axis of the vector according to the invention.

As has been seen, it is possible to attenuate the effects due to pixellation by using an "antialiasing" procedure which consists in mixing for the pixels situated at the boundaries of the vector the color of the vector with the color of the background by applying a mixing law, function of a transparency coefficient A and of the initial colors of the vector and of the background. The core of the invention is to replace the unique mixing law with two mixing laws, the first being applied to the central pixels of the vector and the second to the peripheral parts of the vector. The two mixing laws rest on a single transparency coefficient A common to the two mixing laws. This coefficient is maximal at the center of the vector and equals $A_{MAX}$ and decreases progressively towards zero on moving away from the central axis of said vector as represented in FIG. 7. The switch from the first mixing law to the second mixing law being done for a distance $d_{LIMIT}$ from the central axis of the vector. With this distance $d_{LIMIT}$ is associated a transparency coefficient $A_{LIMIT}$. Thus the halo effect and the "antialiasing" effect are created at one and the same time.

Using the same notation as previously, we call:
$R_D$, $G_D$ and $B_D$ the calorimetric components of the pixel;
$R_S$, $G_S$ and $B_S$ the initial colorimetric components of the vector;
$R_F$, $G_F$ and $B_F$ the initial colorimetric components of the background.

We also denote by:
A the transparency coefficient;
$A_{MAX}$ the maximal transparency coefficient at the center of the vector;
$A_{LIMIT}$ the transparency coefficient separating the two mixing laws;
$A_S$ the transparency coefficient for a given pixel situated at a distance d from the axis of the vector.

Generally, the mathematical function representing A is a Gaussian. When the distance d from the pixel to the central axis is less than the limit distance $d_{LIMIT}$, that is to say when the coefficient $A_S$ is greater than $A_{LIMIT}$, each colorimetric component of each pixel of the vector is proportional to a first mixing law depending on the one hand on a calorimetric component representative of the color of the vector and on the other hand a first transparency law dependent on the transparency coefficient A. By way of example, the first mixing law equals for each component of the pixel:

$$R_D = \left(\frac{A_S}{A_{MAX}}\right)^{EXPONENT} \cdot R_S$$

-continued
$$G_D = \left(\frac{A_S}{A_{MAX}}\right)^{EXPONENT} \cdot G_S$$
$$B_D = \left(\frac{A_S}{A_{MAX}}\right)^{EXPONENT} \cdot B_S$$

The value EXPONENT makes it possible to modulate the decay of the colorimetric components. With this type of mixing law, the calorimetric components are maximal at the center of the vector and decrease as one moves further away, creating a black halo around the central axis of the vector.

When the distance d from the pixel to the central axis is greater than the limit distance $d_{LIMIT}$, that is to say when the coefficient $A_S$ is less than $A_{LIMIT}$, each calorimetric component of each pixel of the vector is proportional to a second mixing law, sum:
of the first mixing law depending on the one hand on the calorimetric component representative of the color of the vector and on the other hand the first transparency law dependent on said distance from the center of the pixel to the center of the vector;
of an additional function depending on the one hand on the colorimetric component representative of the color of the background and on the other hand a second transparency law dependent on said distance from the center of the pixel to the center of the vector.

The second transparency law depends on the same transparency coefficient A as the first transparency law.

By way of example, the second mixing law equals for each component of the pixel:

$$R_D = \left[\left(\frac{A_S}{A_{MAX}}\right)^{EXPONENT} \cdot R_S\right] + \left[\left(1 - \left(\frac{A_S}{A_{LIMIT}}\right)^{EXPONENT}\right) \cdot R_F\right]$$

$$G_D = \left[\left(\frac{A_S}{A_{MAX}}\right)^{EXPONENT} \cdot G_S\right] + \left[\left(1 - \left(\frac{A_S}{A_{LIMIT}}\right)^{EXPONENT}\right) \cdot G_F\right]$$

$$B_D = \left[\left(\frac{A_S}{A_{MAX}}\right)^{EXPONENT} \cdot B_S\right] + \left[\left(1 - \left(\frac{A_S}{A_{LIMIT}}\right)^{EXPONENT}\right) \cdot B_F\right]$$

With this type of mixing law, the colorimetric components are minimal when d is equal to $d_{LIMIT}$ then progressively increase so as to attain the values of the calorimetric components of the color of the background.

Figure 8:
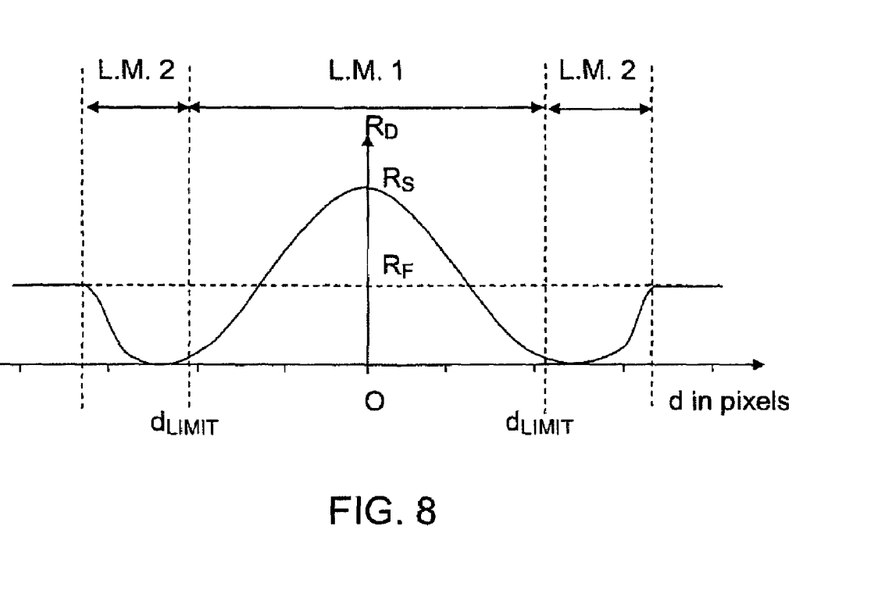
FIG. 8 represents the variation of a calorimetric component as a function of mixing laws according to the invention.

By way of example, FIG. 8 shows the variation of the component $R_D$ of the pixels as a function of the distance d from the central axis of the vector. The dashed vertical limits correspond to the limits of application of the mixing laws LM1 and LM2. At the center of the vector, the color of the pixels is that of the initial color of the vector, then as the pixels move further away from the central axis, this color decreases in intensity and darkens, finally the color of the pixels tends to become that of the background. The colorimetric components $G_D$ and $B_D$ have much the same shape. Thus the desired double effect is indeed obtained: blurring of the boundaries of the vector due to antialiasing and dark outline due to halo.

Figure 9:
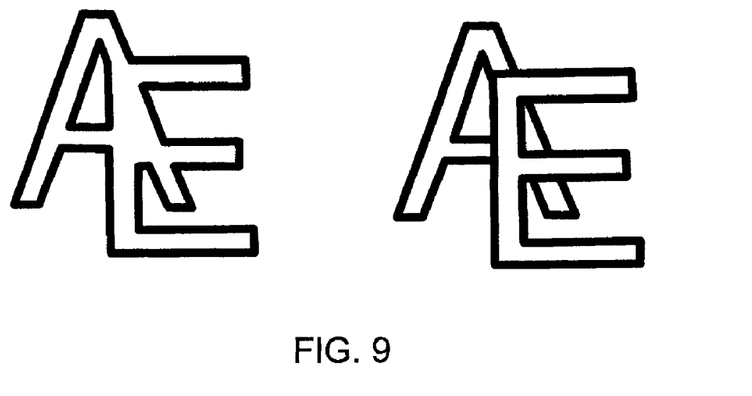
FIG. 9 represents a case of management of priority of symbologies.

As has been stated, the symbologies are assigned an order of priority, making it possible to display the fundamental information in as readable a manner as possible. FIG. 9 illustrates this principle. Consider two letters A and E composed of elementary vectors, if the component vectors of these letters have the same priority, then when the two letters occupy the same space, the letters mix together as indicated on the left part of FIG. 9. If, conversely, one of the letters has priority, for example the letter E, then the two letters A and E are distinguished without ambiguity as indicated on the right part of FIG. 9.

Figure 10:
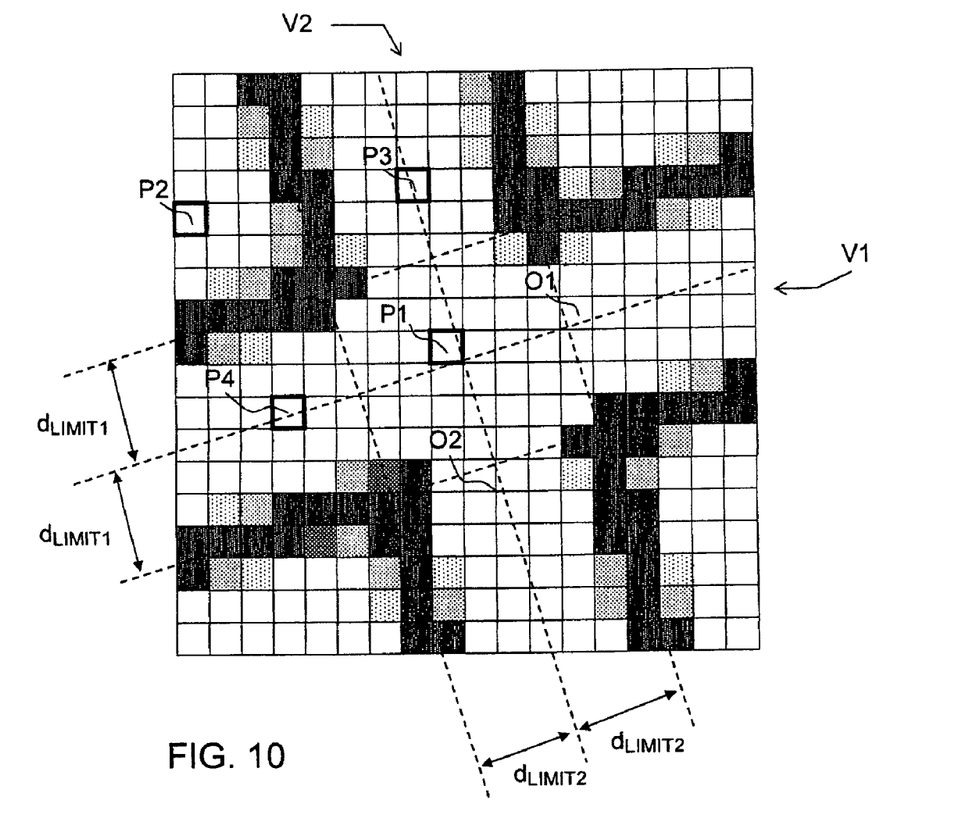
FIG. 10 represents the crossing of two vectors according to the invention having identical orders of priority.

In the case of the invention, the management of the priorities is done in the following manner:

When two vectors V1 and V2 of identical priority have a common intersection as illustrated in FIG. 10, the calorimetric components depend on the position of the pixel with respect to the central axes of the vectors V1 and V2. Represented dashed in FIG. 10 are the central axes O1 and O2 of the vectors V1 and V2 as well as the limit distances $d_{LIMIT1}$ and $d_{LIMIT2}$ defining the limits of application of the mixing laws for each vector and also represented are four pixels P1, P2, P3 and P4 representing the four possible configurations as a function of the distances from the axes O1 and O2, these four pixels are surrounded by a thick outline in FIG. 11 to distinguish them from the other pixels of the display. The second vector V2 being drawn after the first vector V1, in the intersection zone, the colorimetric components of the pixels of the second vector are determined in the following manner, the pixels of the first vector being regarded for the application of the mixing laws as a colored background:

If the distance from the center of the pixel P1 to the center of the second vector V2 is less than the distance $d_{LIMIT2}$ representative of the thickness of the second vector and if the distance from the center of the pixel P1 to the center of the first vector V1 is less than the distance $d_{LIMIT1}$ representative of the thickness of the first vector, the calorimetric components of the pixel are proportional to a mixing law of second mixing law type;

If the distance from the center of the pixel P2 to the center of the second vector V2 is greater than the distance $d_{LIMIT2}$ representative of the thickness of the second vector V2 and if the distance from the center of the pixel P2 to the center of the first vector V1 is greater than the distance $d_{LIMIT1}$ representative of the thickness of the first vector V1, the calorimetric components of the pixel P2 are proportional to a mixing law of second mixing law type;

If the distance from the center of the pixel P3 to the center of the second vector is less than the representative distance $d_{LIMIT2}$ of the thickness of the second vector V2 and if the distance from the center of the pixel P3 to the center of the first vector V1 is greater than the distance $d_{LIMIT1}$ representative of the thickness of the first vector V1, the calorimetric components of the pixel P3 are proportional to a mixing law of first mixing law type;

If the distance from the center of the pixel P4 to the center of the second vector V2 is greater than the distance $d_{LIMIT2}$ representative of the thickness of the second vector V2 and if the distance from the center of the pixel to the center of the first vector V1 is less than the distance $d_{LIMIT1}$ representative of the thickness of the first vector V1, the calorimetric components of the pixel P4 are not modified and remain that of the pixel of the first vector.

Figure 11:
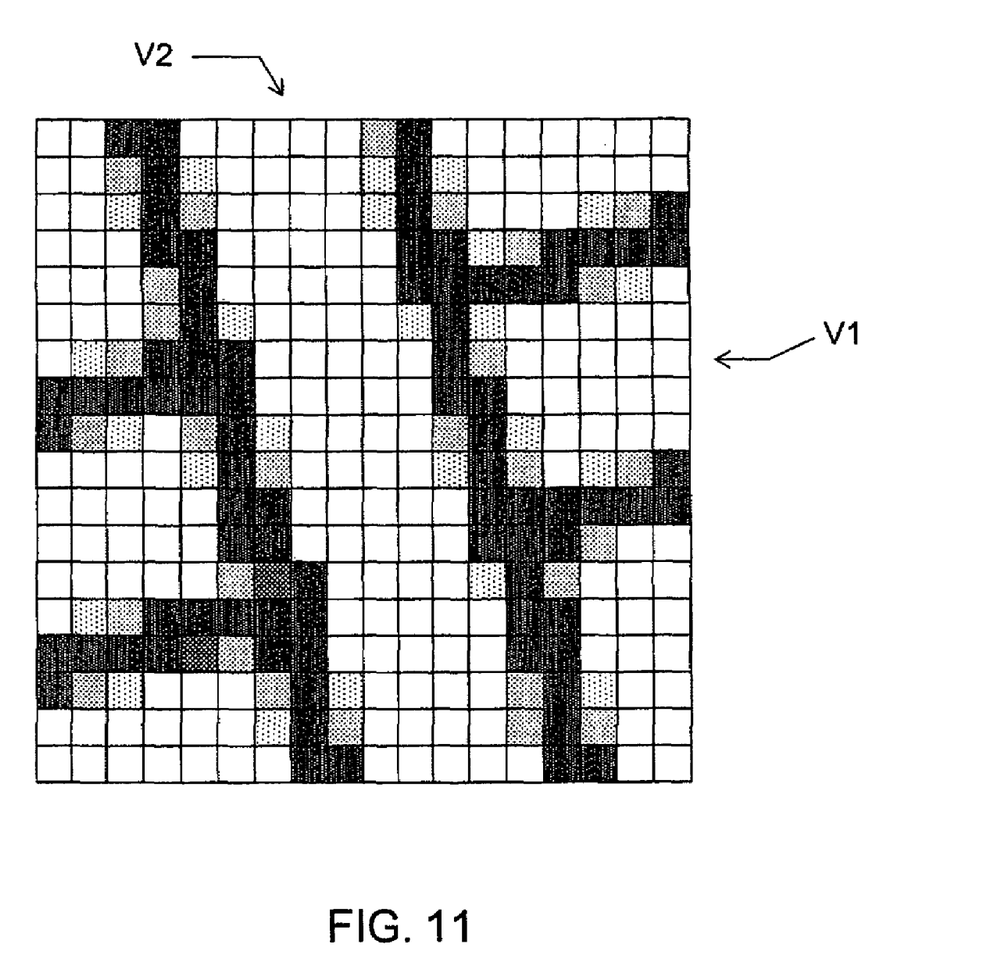
FIG. 11 represents the crossing of two vectors according to the invention having different orders of priority.

When two vectors V1 and V2 of different priority have a common intersection, in the intersection zone, the colorimetric components of each pixel P depend on the position of the pixel with respect to the central axes of the vectors V1 and V2 as well as limit distances $d_{LIMIT1}$ and $d_{LIMIT2}$ defining the limits of application of the mixing laws for each vector. According to the distance d from the center of the pixel P to the axes O1 and O2 of the first vector V1 and of the second vector V2, we have, as previously, four possible configurations which are:

$d < d_{LIMIT1}$ and $d < d_{LIMIT2}$
$d < d_{LIMIT1}$ and $d > d_{LIMIT2}$
$d > d_{LIMIT1}$ and $d < d_{LIMIT2}$
$d > d_{LIMIT1}$ and $d > d_{LIMIT2}$ For each configuration, according to the order of priority of the vector and according to the order of drawing of said vector, the mixing laws making it possible to determine the colorimetric components of the pixel vary in such a way that the calorimetric components of the pixel are those of the pixel of the vector having the highest priority as illustrated in FIG. 11 where the vector V2 has priority over the vector V1.

The invention claimed is:

1. A method of generating at least one colored vector surrounded by a dark contour on a colored background, comprising:

displaying a colored vector surrounded by a dark contour on a colored background on a matrix screen of a display device composed of pixels; and setting the color of the pixels using three colorimetric components, wherein each colorimetric component of each pixel of the vector is proportional to either a first mixing law or a second mixing law;

wherein the first mixing law is applied
when the distance from the center of the pixel to the center of the vector is less than a distance $d_{LIMIT}$ representative of the thickness of the vector, the first mixing law based on a colorimetric component representative of the color of the vector and a first transparency law dependent on said distance from the center of the pixel to the center of the vector; and wherein the second mixing law is applied when the distance from the center of the pixel to the center of the vector is greater than the distance $d_{LIMIT}$ representative of the thickness of the vector, the second mixing law comprising a sum of:
the first mixing law;
an additional function depending on a colorimetric component representative of the color of the background and a second transparency law dependent on said distance from the center of the pixel to the center of the vector.

2. The method of vector generation as claimed in claim 1, wherein the first transparency law is maximal when the distance from the center of the pixel to the center of the vector is zero and decreases as a function of said distance.

3. The method of vector generation as claimed in claim 1, wherein the second transparency law is minimal when the distance from the center of the pixel to the center of the vector corresponds to the distance representative of the thickness of the vector and increases as a function of said distance up to a finite limit.

4. The method of vector generation as claimed in claim 1, wherein the first mixing law is the product of one of the colorimetric components representative of the color of the vector, multiplied by the first transparency law dependent on the distance from the center of the pixel to the center of the vector.

5. The method of vector generation as claimed in claim 1, wherein the additional function of the second mixing law is the product of one of the colorimetric components of the background, multiplied by the second transparency law dependent on the distance from the center of the pixel to the center of the vector.

6. The method of vector generation as claimed in claim 1, wherein the first and the second transparency law depend on a transparency Coefficient, wherein variations of the coefficient obey a same law of variation.

7. The method of vector generation as claimed in claim 6, wherein the mathematical function representing the transparency coefficient is a Gaussian function.

8. The method of vector generation as claimed in claim 1, wherein an order of priority of drawing is associated with the at least one vector.

9. The method of vector generation as claimed in claim 8, wherein, when two vectors of different priority have a common intersection, in an intersection zone formed by the intersection of the two vectors, the colorimetric components of the pixels are those of the pixels of the vector having the highest priority.

10. The method of vector generation as claimed in claim 8, wherein drawing two vectors of identical priority having a common intersection in an intersection zone, comprises:

drawing second vector after the first vector;

determining the colorimetric components of the pixels of the second vector, the pixels of the first vector being regarded for the application of the mixing laws as a colored background, the determining of the colorimetric components of the pixels of the second vector including:

setting the colorimetric components of the pixel proportional to a mixing law of second mixing law type if the distance from the center of the pixel to the center of the second vector is less than a distance representative of the thickness of the second vector and if the distance from the center of the pixel to the center of the first vector is less than a distance representative of the thickness of the first vector;

setting the colorimetric components of the pixel proportional to a mixing law of second mixing law type if the distance from the center of the pixel to the center of the second vector is less than a distance representative of the thickness of the second vector and if the distance from the center of the pixel to the center of the first vector is greater than a distance representative of the thickness of the first vector;

setting the colorimetric components of the pixel proportional to a mixing law of the first mixing law type if the distance from the center of the pixel to the center of the second vector is less than a distance representative of the thickness of the second vector and if the distance from the center of the pixel to the center of the first vector is greater than a distance representative of the thickness of the first vector;

setting the colorimetric components of the pixel proportional to a mixing law of the first mixing law type if the distance from the center of the pixel to the center of the second vector is less than a distance representative of the thickness of the second vector and if the distance from the center of the pixel to the center of the first vector is greater than a distance representative of the thickness of the first vector; and leaving the pixels of the second vector unmodified if the distance from the center of the pixel to the center of the second vector is greater than a distance representative of the thickness of the second vector and if the distance from the center of the pixel to the center of the first vector is less than a distance representative of the thickness of the first vector.

* * * * *